(12) United States Patent
Bahabad

(10) Patent No.: US 10,852,462 B2
(45) Date of Patent: Dec. 1, 2020

(54) SYSTEM AND METHOD FOR OPTICAL FILTERING

(71) Applicant: Ramot at Tel-Aviv University Ltd., Tel-Aviv (IL)

(72) Inventor: Alon Bahabad, Herzliya (IL)

(73) Assignee: Ramot at Tel-Aviv University Ltd., Tel-Aviv (IL)

( * ) Notice: Subject to any disclaimer, the term of this patent is extended or adjusted under 35 U.S.C. 154(b) by 10 days.

(21) Appl. No.: 16/074,439

(22) PCT Filed: Jul. 25, 2017

(86) PCT No.: PCT/IL2017/050834
§ 371 (c)(1),
(2) Date: Aug. 1, 2018

(87) PCT Pub. No.: WO2018/020498
PCT Pub. Date: Feb. 1, 2018

(65) Prior Publication Data
US 2019/0056544 A1    Feb. 21, 2019

Related U.S. Application Data

(60) Provisional application No. 62/366,171, filed on Jul. 25, 2016.

(51) Int. Cl.
*G02B 5/20* (2006.01)
*G02B 5/18* (2006.01)

(52) U.S. Cl.
CPC ............ *G02B 5/203* (2013.01); *G02B 5/1814* (2013.01); *G02B 5/1866* (2013.01)

(58) Field of Classification Search
CPC ..... G02B 5/203; G02B 5/1814; G02B 5/1866
USPC .......................................... 250/237 R, 237 G
See application file for complete search history.

(56) References Cited

U.S. PATENT DOCUMENTS

| | | | | |
|---|---|---|---|---|
| 5,636,304 A | * | 6/1997 | Mizrahi | C03C 13/045 359/3 |
| 7,142,364 B2 | * | 11/2006 | Suh | B82Y 20/00 359/587 |
| 7,492,980 B2 | * | 2/2009 | McCarthy | G02B 6/02123 385/12 |
| 10,073,191 B2 | * | 9/2018 | Shen | G02F 1/0147 |
| 2010/0328587 A1 | | 12/2010 | Yamada et al. | |
| 2012/0327248 A1 | | 12/2012 | Tack et al. | |

(Continued)

FOREIGN PATENT DOCUMENTS

| | | |
|---|---|---|
| FR | 3020878 | 11/2015 |
| JP | 2015-501432 | 1/2015 |
| WO | WO 2013/064510 | 5/2013 |

(Continued)

OTHER PUBLICATIONS

International Search Report and the Written Opinion dated Nov. 16, 2017 From the International Searching Authority Re. Application No. PCT/IL2017/050834. (14 Pages).

(Continued)

*Primary Examiner* — Seung C Sohn

(57) ABSTRACT

An optical device comprises a first grating and a second grating formed on or attached to a dielectric layer, and configured to simultaneously couple an optical field interacting therewith into two distinct Fano-Feshbach resonances.

24 Claims, 9 Drawing Sheets

(56) References Cited

U.S. PATENT DOCUMENTS

2014/0267849 A1  9/2014  Geelen et al.
2015/0080253 A1  3/2015  Wei et al.

FOREIGN PATENT DOCUMENTS

WO  WO 2015/169761  11/2015
WO  WO 2018/020498   2/2018

OTHER PUBLICATIONS

Zhao et al. "Transmission Comb of a Distributed Bragg Reflector With Two Surface Dielectric Gratings", Scientific Reports, 6: 21125-1-21125-7, Feb. 19, 2016.
Supplementary European Search Report and the European Search Opinion dated Jan. 30, 2020 From the European Patent Office Re. Application No. 17833701.0. (12 Pages).
Ricciardi et al. "Evidence of Guided Resonances in Photonic Quasicrystal Slabs", Physical Review B, XP055659322, 84(8): 085135-1-085135-4, Published Online Aug. 29, 2011.
Shuai et al. "Transfer Printed Nanomembrane High-Q Filters Based on Displaced Double-Layer Fano Resonance Photonic Crystal Slabs", 2013 IEEE Photonics Conference, Bellevue, WA, USA, Sep. 8-12, 2013, XP032523705, p. 444-445, Sep. 8, 2013.

\* cited by examiner

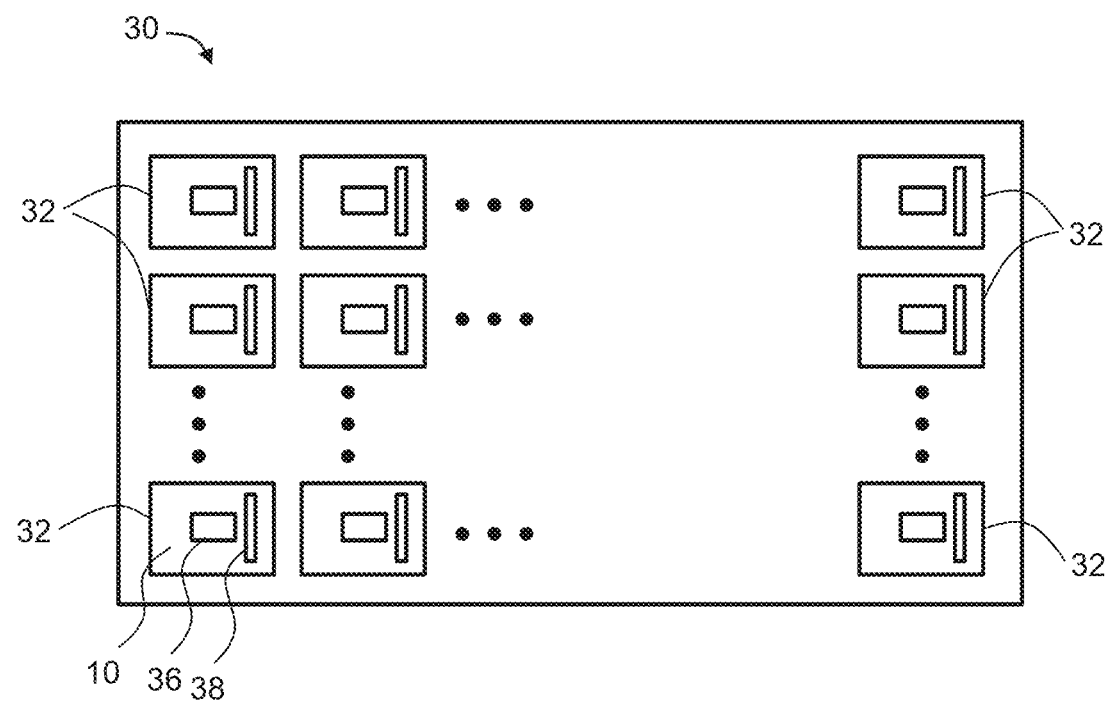
FIG. 2
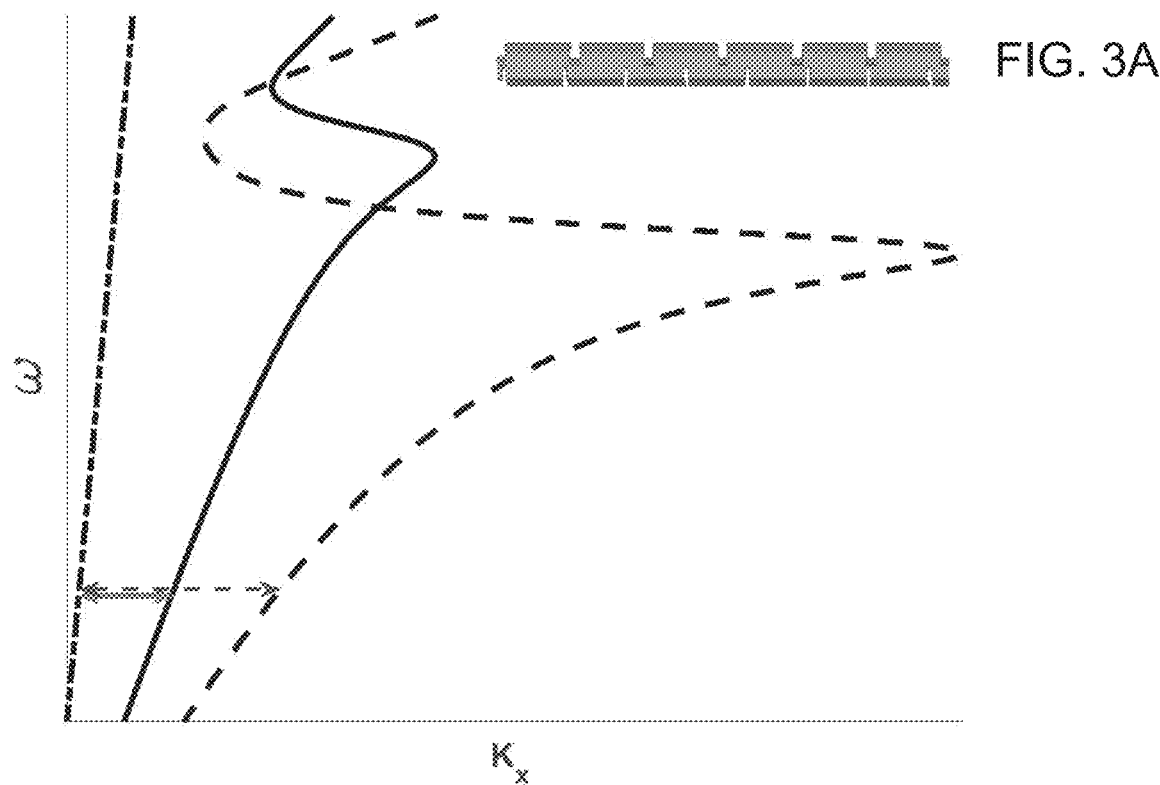
FIG. 3A
FIG. 3B

FIG. 4A
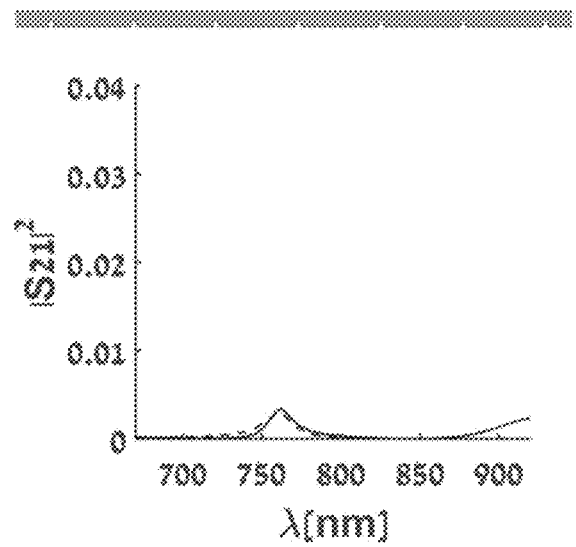
FIG. 4B
FIG. 4C
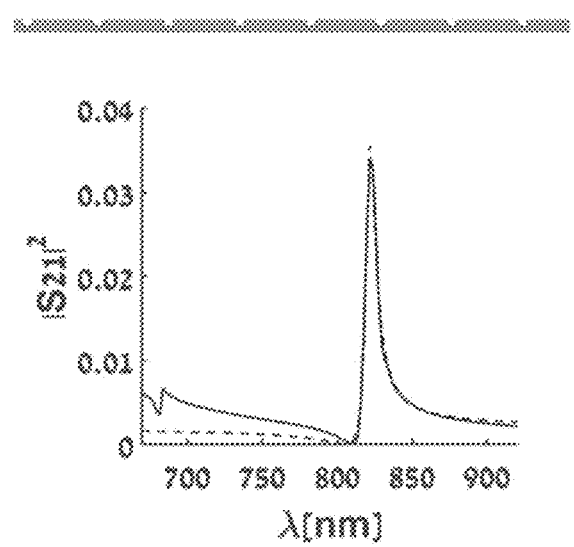
FIG. 4D
FIG. 4E
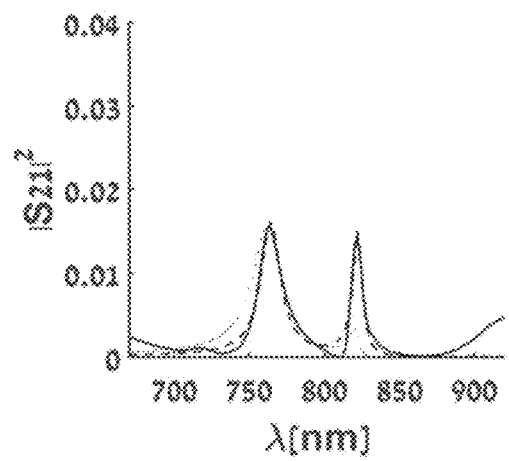
FIG. 4F

FIG. 5A
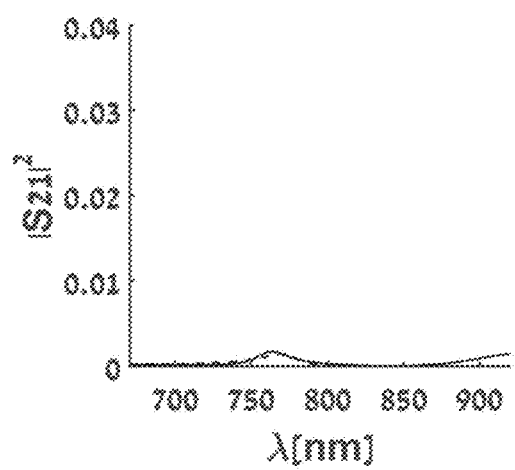
FIG. 5B
FIG. 5C
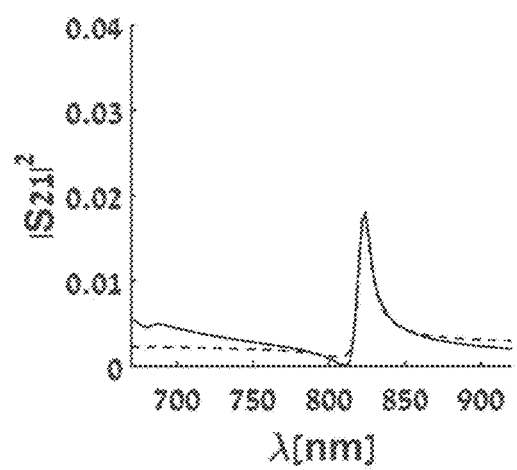
FIG. 5D
FIG. 5E
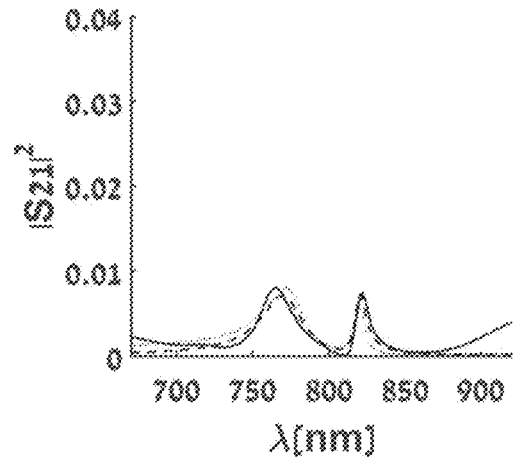
FIG. 5F

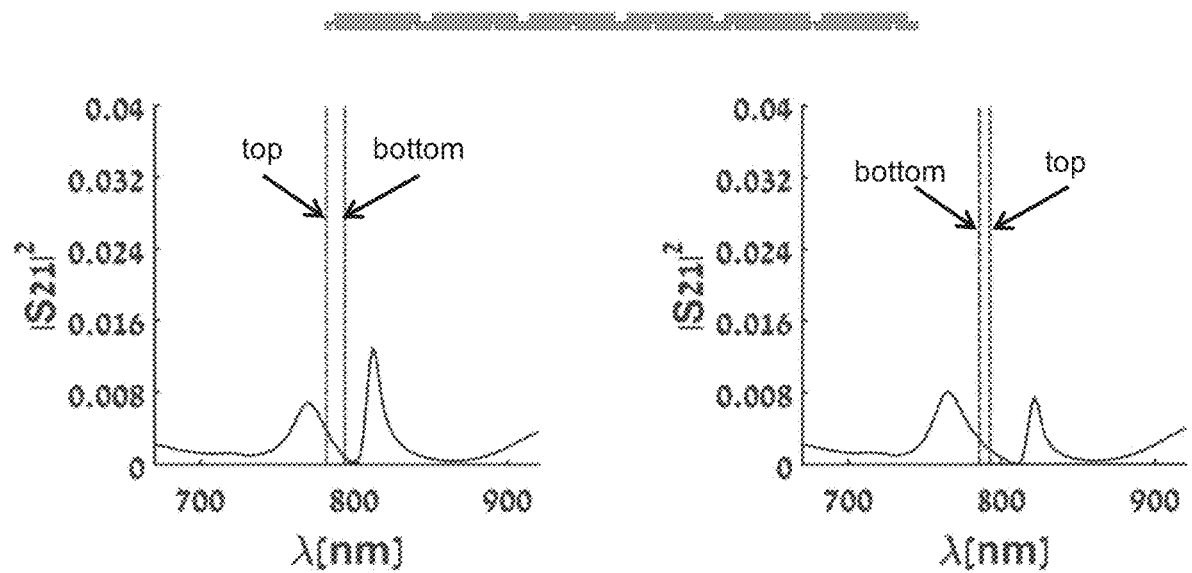
FIG. 7A
FIG. 7B
FIG. 7C
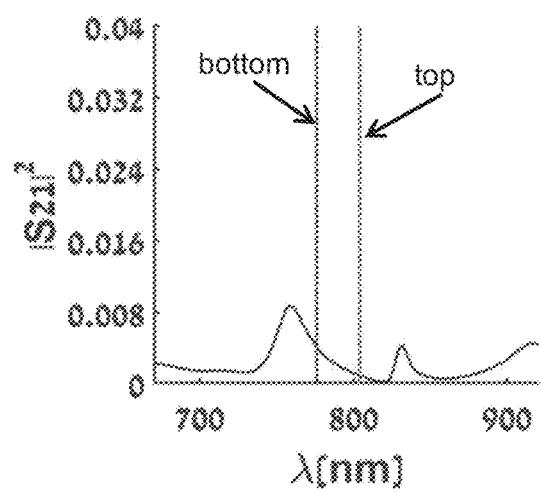
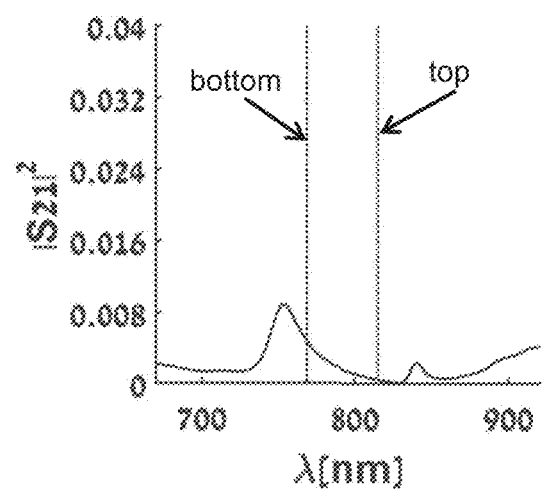
FIG. 7D
FIG. 7E

SYSTEM AND METHOD FOR OPTICAL FILTERING

RELATED APPLICATIONS

This application is a National Phase of PCT Patent Application No. PCT/IL2017/050834 having International filing date of Jul. 25, 2017, which claims the benefit of priority under 35 USC § 119(e) of U.S. Provisional Patent Application No. 62/366,171 filed on Jul. 25, 2016. The contents of the above applications are all incorporated by reference as if fully set forth herein in their entirety.

FIELD AND BACKGROUND OF THE INVENTION

The present invention, in some embodiments thereof, relates to optics and, more particularly, but not exclusively, to a system and method for optical filtering.

Asymmetric profiles were found in rare gas spectra [4] and were explained by Fano [5] by taking into account the electron energy dependence on the interaction between a discrete autotomized state and the continuum. A similar resonance was discovered by Feshbach when studying nuclear reactions [6]. In both cases the unique line shape is the result of interference between two pathways—one involving direct scattering to a continuum and the other a transition to the continuum through a meta-stable discrete bound state.

These resonances arise when two transmission pathways, a broad band continuum and a narrow band resonance, interfere with each other. When one of the channels is a highly damped resonance process, its exact resonant frequency is difficult to detect and such a channel can be considered as a broad band continuum. These resonances appear as a notch in the absorption spectrum when the incident electromagnetic wave couples to a strongly damped oscillator, which in turn is coupled to a weakly damped mode. The resulting effective coupling between the two modes depends on the frequency in a narrow interval around the frequency of the weakly damped oscillator and gives rise to modulation of the absorption spectrum.

In a particular case of the Fano-Feshbach profiles, two discrete states are coupled to the same continuum [4, 10, 11]. This phenomenon is referred to as a double Fano-Feshbach resonance (double FFR). In some such cases, the generated line-shape is identical to the one associated with the phenomenon of Electromagnetically Induced Transparency (EIT) [12].

To date, nano-photonic structure supporting a double FFR are made of resonant structures associated with local oscillations, particularly nano-antenna based structures [13, 20], including a super-cell grating structure based on Fabri-Perot resonances [21].

SUMMARY OF THE INVENTION

According to an aspect of some embodiments of the present invention there is provided an optical device. The optical device comprises a first grating and a second grating formed on or attached to a dielectric layer, and configured to simultaneously couple an optical field interacting therewith into two distinct Fano-Feshbach resonances.

According to some embodiments of the invention the first grating and the second grating are dielectric gratings formed on the same side of the dielectric substrate.

According to some embodiments of the invention the first grating and the second grating are formed on the same side of a metallic layer attached to the dielectric substrate.

According to some embodiments of the invention the first grating and the second grating are formed on opposite sides of a metallic layer, wherein the dielectric layer is disposed on the first grating.

According to some embodiments of the invention a vertical separation between the first grating and the second gratings, perpendicularly to the metallic layer is from about 5 nm to about 20 nm, e.g., about 10 nm.

According to some embodiments of the invention the metallic layer comprises a material selected from the group consisting of gold, silver, platinum, aluminum, copper, rhodium, iridium, tungsten and molybdenum.

According to some embodiments of the invention the first and the second gratings differ in at least one grating characteristic selected from the group consisting of a grating period, a grating function, a grating depth, and a grating duty cycle.

According to some embodiments of the invention each of the first grating and the second gratings has a grove depth of from about 10 nm to about 100 nm, more preferably from about 30 nm to about 60 nm.

According to some embodiments of the invention the device comprises an additional dielectric layer disposed on the second grating, wherein the first and the second dielectric layers are made of different materials.

According to some embodiments of the invention at least one of the gratings is a chirped quasiperiodic grating.

According to an aspect of some embodiments of the present invention there is provided an optical device. The device comprises a quasiperiodic grating formed on or attached to a dielectric layer and configured to simultaneously couple an optical field interacting therewith into two distinct Fano-Feshbach resonances.

According to some embodiments of the invention the grating is a dielectric grating formed on the dielectric layer.

According to some embodiments of the invention the grating is a metallic grating formed on a metallic layer, and wherein the dielectric layer is disposed on the grating.

According to some embodiments of the invention the metallic layer comprises a material selected from the group consisting of gold, silver, platinum, aluminum, copper, rhodium, iridium, tungsten and molybdenum.

According to some embodiments of the invention the grating is a chirped quasiperiodic grating.

According to some embodiments of the invention the dielectric layer comprises a dielectric material selected from the group consisting of sapphire, quartz, silicon, silicon carbide, gallium nitride, gallium phosphide, zirconium diboride, gallium arsenide, silica and glass.

According to some embodiments of the invention a thickness of the dielectric layer is from about 10 μm to about 1 mm.

According to some embodiments of the invention the optical device is designed for a predetermined wavelength and wherein a thickness of the dielectric layer is at least two times the wavelength.

According to an aspect of some embodiments of the present invention there is provided a method of filtering an optical field. The method comprises directing the optical field to the optical device as delineated above and optionally and preferably as further detailed hereinbelow.

According to an aspect of some embodiments of the present invention there is provided an optical sensor. The optical sensor comprises an optical sensing element and the optical device as delineated above and optionally and preferably as further detailed hereinbelow. According to an aspect of some embodiments of the present invention there is provided an optical sensor array. The optical sensor array comprises an array of optical sensors, each comprising the optical sensor, wherein the optical sensors are arranged such that at least two sensing elements receive light from different grating patters.

According to an aspect of some embodiments of the present invention there is provided an optical sensor array. The optical sensor array comprises an array of optical sensing elements, and the optical device as delineated above and optionally and preferably as further detailed hereinbelow. The optical device is disposed on the array, wherein a grating pattern of the optical device varies across the array such that at least two sensing elements receive light from different grating patters.

According to some embodiments of the invention the optical sensor is a CCD sensor. According to some embodiments of the invention the optical sensor is a CMOS sensor.

According to an aspect of some embodiments of the present invention there is provided an imaging system. The imaging system comprises the optical sensor array as delineated above and optionally and preferably as further detailed hereinbelow.

According to an aspect of some embodiments of the present invention there is provided an optical spectrometer, the optical spectrometer comprises the optical sensor array as delineated above and optionally and preferably as further detailed hereinbelow.

According to an aspect of some embodiments of the present invention there is provided an optical communication system, the optical communication system comprises the optical sensor array as delineated above and optionally and preferably as further detailed hereinbelow.

According to an aspect of some embodiments of the present invention there is provided a slow-light optical system, the slow-light optical system comprises the optical sensor array as delineated above and optionally and preferably as further detailed hereinbelow.

According to an aspect of some embodiments of the present invention there is provided a wavelength multiplexing system, the wavelength multiplexing system comprises the optical sensor array as delineated above and optionally and preferably as further detailed hereinbelow.

According to an aspect of some embodiments of the present invention there is provided a wavelength demultiplexing system, the wavelength demultiplexing system comprises the optical sensor array as delineated above and optionally and preferably as further detailed hereinbelow.

According to an aspect of some embodiments of the present invention there is provided an optical tuning system, the optical tuning system comprises the optical sensor array as delineated above and optionally and preferably as further detailed hereinbelow.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings:

FIG. 2 is a schematic illustration of an array of optical sensors, according to some embodiments of the present invention.

FIGS. 3A and 3B shows a scheme suitable for generating a double Fano-Feshbach resonance (double FFR), according to some embodiments of the present invention. An asymmetric IMI structure, whose metallic layer is shown in FIG. 3A, is characterized by two dispersion curves (continuous and dashed lines in FIG. 3B) for two metal-dielectric interfaces of the structure. For nearly energy-degenerate double FFR line shape, two gratings are etched into the interfaces allowing mode coupling of two nearly degenerate radiation modes (whose dispersion line is denoted with a dot-dash line) to corresponding plasmonic modes at the two interfaces. In this example, the gratings have periodicities which are inversely proportional to the momentum mismatch denoted with a continuous and a dashed double-arrow lines. In the Inset, red color represents the top dielectric, light blue color represents the metallic layer in the middle, and dark blue represents the bottom dielectric.

FIG. 4A-F show single FFR and double FFR resonances for a lossless case. Numerical simulations of transmission profile (continuous line) and best-fit FFR line-shapes (dashed line) for: a single FFR for a device with a bottom corrugation having a periodicity of $\Lambda_2$=500 [nm] (FIGS. 4A and 4B), a single FFR for a device with a top corrugation having a periodicity of $\Lambda_1=630$ [nm] (FIGS. 4C and 4D), and a double FFR for a double-grating device with periodicities of $\Lambda_1=630$ [nm] at the top and $\Lambda_2=500$ [nm] at the bottom side (FIGS. 4E and 4F). The dotted line represents EQ. (3), below, with the parameters that fit the two separate single FFR devices. FIGS. 4A, 4C and 4E illustrate the grating structures, and FIGS. 4B, 4D and 4F illustrate the respective resonance spectra.

FIGS. 5A-F show single FFR and double FFR resonances for a lossy case. Numerical simulations of the transmission profile (continuous line) and best-fit FFR line-shapes (dashed line) for: a single FFR for a device with a bottom corrugation having a periodicity of $\Lambda_2=500$ [nm] (FIGS. 5A and 5B), a single FFR for a device with a top corrugation having a periodicity of $\Lambda_1=630$ [nm] (FIGS. 5C and 5D), and a double FFR for a double-grating device with periodicities of $\Lambda_1=630$ [nm] at the tope side and $\Lambda_2=500$ [nm] at the bottom side. The dotted line represents Eq. (3), below, with the parameters that fit the two separate single FFR devices. FIGS. 5A, 5C and 5E illustrate the grating structures, and FIGS. 5B, 5D and 5F illustrate the respective resonance spectra.

FIGS. 7A-E show the effect the incidence angle have on the double FFR line-shape for different incident angles. FIG. 7A illustrates the grating structure with period $\Lambda_1=630$ [nm] at the top side and $\Lambda_2=500$ [nm] at the bottom side, FIG. 7B shows the spectrum for incident angle of $\theta_{inc}=15°$, FIG. 7C shows the spectrum for incident angle of $\theta_{inc}=14°$ FIG. 7D shows the spectrum for incident angle of $\theta_{inc}=16°$, and FIG. 7E shows the spectrum for incident angle of $\theta_{inc}=17°$. The vertical dashed lines mark the wavelength at which Eq. (1), below, is satisfied for the different grating periods for the structure containing only the top or bottom corrugation.

FIG. 8A illustrate the grating structure, and FIGS. 8B and 8C show simulated reflection ($S_{11}$) and transmission ($S_{21}$) spectra, respectively. The dimensions of the structure are L1=430 nm; L2=435 nm; H1=100 nm; H2=20 nm; W1=65 nm; W2=20 nm.

FIG. 9A illustrate the grating structure, and FIGS. 9B and 9C show simulated reflection ($S_{11}$) and transmission ($S_{21}$) spectra, respectively. The dimensions of the structure are L1=255 nm; L2=250 nm; H1=260 nm; H2=52 nm; W1=242 nm; W2=237 nm.

FIG. 10A illustrate the grating structure, and FIGS. 10B and 10C show simulated reflection ($S_{11}$) and transmission ($S_{21}$) spectra, respectively. The dimensions of the structure are L1=200 nm; L2=360 nm; H=150 nm; W1=180 nm; W2=342 nm.

DESCRIPTION OF SPECIFIC EMBODIMENTS OF THE INVENTION

Figure 1A:
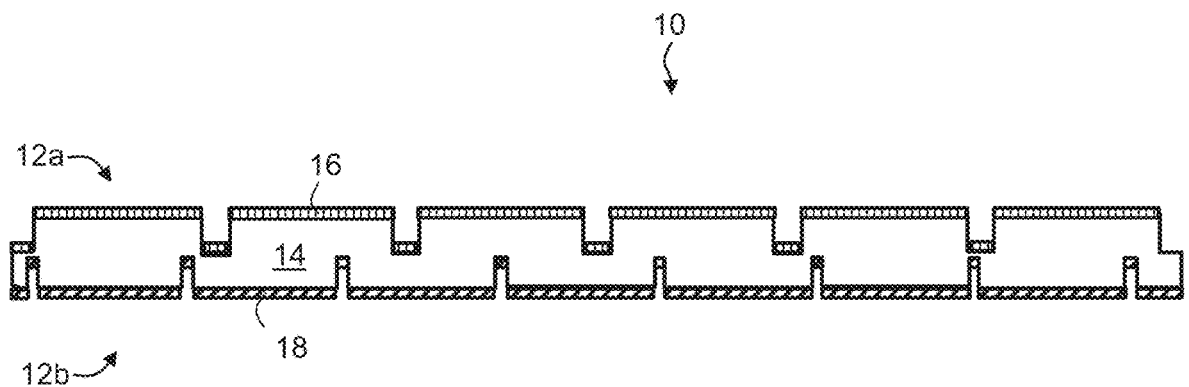
FIGS. 1A-C are schematic illustrations of an optical device according to some embodiments of the present invention.

The present invention, in some embodiments thereof, relates to optics and, more particularly, but not exclusively, to a system and method for optical filtering.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

The present Inventor successfully generated various line shapes by exploiting two discrete optical states coupled to the same continuum. The discrete optical states can be coupled by different periodic diffraction gratings or by a single quasiperiodic diffraction grating. In various exemplary embodiments of the invention a gratings-based plasmonic structure is employed to achieve a nearly-degenerate double Fano resonance hence to provide to provide a sufficiently narrow spectral line shape. The double-resonance spectral location and line-shape are optionally and preferably controlled by adjusting the periodicity and unit-cell of the gratings and/or by adjusting the angle of incidence of the incoming radiation.

Figure 1B:
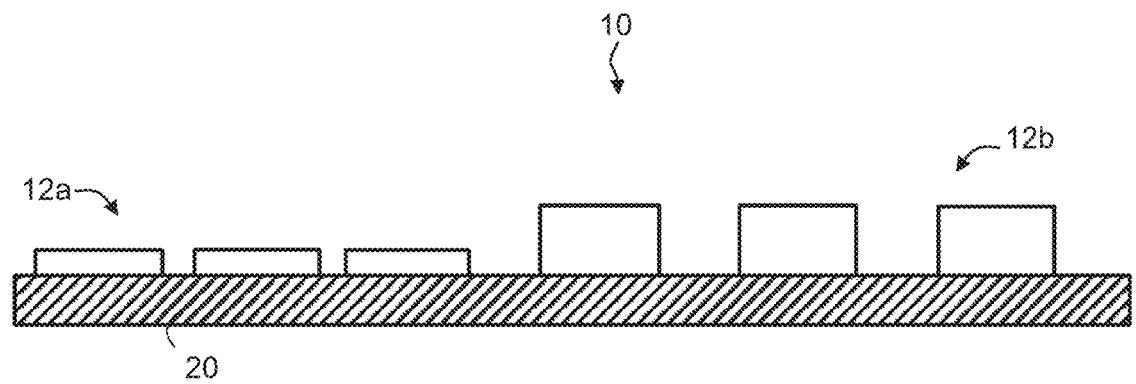
Figure 1C:
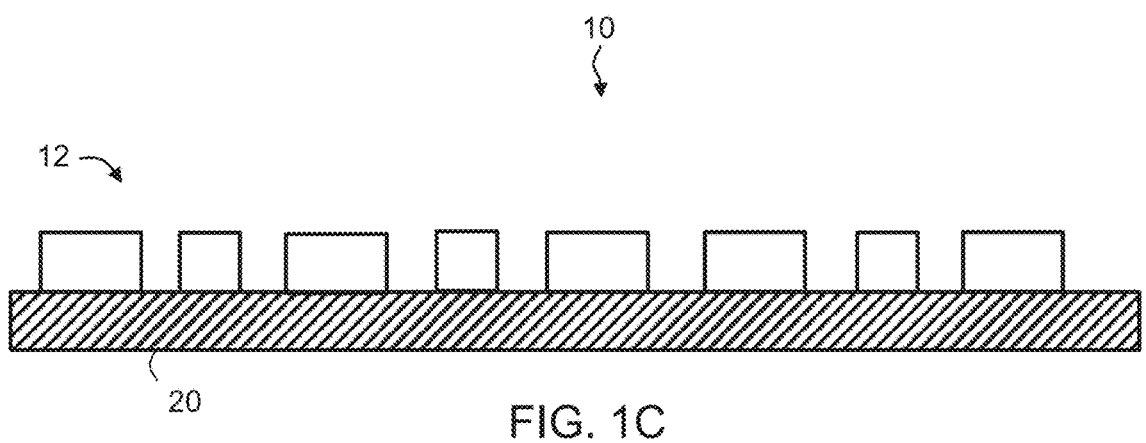

Referring now to the drawings, FIGS. 1A-C are schematic illustrations of an optical device 10 according to some embodiments of the present invention. Device 10 comprises one or more gratings referred to collectively as grating(s) 12, and individually as grating 12a, grating 12b, etc. Grating(s) 12 is/are preferably selected to simultaneously couple an optical field interacting with grating(s) 12 into two distinct Fano-Feshbach resonances. Thus, device 10 induces a double Fano-Feshbach resonance on the optical field. This is optionally and preferably achieved by providing grating or gratings that resonate at different wavelengths of the optical field. For example, the grating(s) can be configured to couple an incoming optical field to Surface Plasmon Polaritons of different momenta. The two SPP preferably have nearly the same energy. Specifically, denoting the frequencies of the two plasmon modes by $\omega_1$ and $\omega_2$, the ratio $$\frac{|\omega_2 - \omega_1|}{\omega_2 + \omega_1}$$

is preferably less than 0.3 and more than 0.001, or less than 0.1 and more than 0.001, or less than 0.05 and more than 0.001, or less than 0.01 and more than 0.001, or less than 0.005 and more than 0.001, or less than 0.001 and more than 0.0001.

The optical field can interact with the grating(s) 12 by passing through device 10 (transmittance interaction) or reflecting off device 10 (reflectance interaction).

The grove depth of the grating(s) can be from about 10 nm to about 300 nm, or from about 20 nm to about 250 nm, or from about 20 nm to about 200 nm, or from about 20 nm to about 120 nm. Other grove depths are also contemplated.

When there is more than one grating, the gratings differ in one or more parameters selected from the group consisting of a grating period, a grating grove depth, and a grating duty cycle. When there is one grating, the grating forms a grating pattern, for example, a quasiperiodic grating pattern, wherein one or more of these parameters varies along this pattern.

The present embodiments contemplate several configurations for grating(s) 12. In some embodiments of the present invention gratings 12 comprise a first grating 12a and a second grating 12b. These embodiments are illustrated in FIGS. 1A and 1B. The periods of the gratings are optionally and preferably selected such that their individual Surface Plasmon Polariton resonances (namely had each of the two gratings been the sole grating) are less than 200 nm or less than 150 nm less than 100 nm or less than 90 nm or less than 80 nm or less than 70 nm or less than 60 nm or less than 50 nm or less than 40 nm or less than 30 nm from each other.

FIG. 1A illustrates an embodiment in which gratings 12a and 12b are formed on opposite sides of a metallic layer 14. In these embodiments, a dielectric layer 16 is optionally and preferably disposed on first grating 12a. Also contemplated, are embodiments in which an additional a dielectric layer 18 is disposed also on second grating 12b. In these embodiments, grating 12a and 12b differ in at least their grove depth, and optionally and preferably in at least one additional parameter, such as, but not limited to, the grating period. For example, the grove depth of grating 12a can be at least 2 times deeper or at least 3 times deeper or at least 4 times deeper than the grove depth of grating 12b. Typical grove depths for grating 12a are, without limitation, from about 80 nm to about 120 nm, and grove depths for grating 12b are, without limitation, from about 15 nm to about 40 nm.

The vertical separation between grating 12a and 12b, as measured perpendicularly to metallic layer 14 can be from about 5 nm to about 20 nm, e.g., about 10 nm. The metallic layer can comprise any material, preferably a metal selected from the group consisting of gold, silver, platinum, aluminum, copper, rhodium, iridium, tungsten and molybdenum.

FIG. 1B illustrates an embodiment in which gratings 12a and 12b are formed on the same side of a dielectric layer 20. The advantage of having the gratings at the same side of layer 20 is that the overall efficiency is improved. In these embodiments, the gratings 12a and 12b can be dielectric gratings, or they can be metallic gratings formed on the same side of a metallic layer 14 (not shown in FIG. 1B, see FIG. 1A) attached to dielectric substrate 20. When gratings 12a and 12b are dielectric gratings, their grove depth can be the same, but they differ in a grating parameter other than the grove depth. However, this need not necessarily be the case, since, for some applications, it may not be necessary for the dielectric gratings to have the same grove depth. When gratings 12a and 12b are metallic gratings formed on the same side of a metallic layer, their grove depths preferably differ, as further detailed hereinabove with respect to FIG. 1A. Optionally, one or both of gratings 12a and 12b is coated with a dielectric layer as further detailed hereinabove.

Any of gratings 12a and 12b can, in some embodiments of the present invention, be a chirped quasiperiodic grating.

As used herein "quasiperiodic grating," refers to a diffraction grating having an ordered arrangement of building blocks that lack translational symmetry of any kind, but exhibit a diffraction pattern in the form of an essentially discrete spectrum.

As used herein "chirped quasiperiodic grating," refers to a quasiperiodic grating with a geometrical parameter that varies monotonically (e.g., linearly) along a direction perpendicular to the grating groves.

When a quasiperiodic grating is employed, it is not necessary for device 10 to include more than one grating. FIG. 1C is a schematic illustration of an embodiment in which device 10 comprises a single grating 12 that is a quasiperiodic grating. The quasiperiodic grating can be formed on a metallic layer 14 (not shown) as further detailed hereinabove (see FIG. 1A), or it can be a dielectric grating formed on the same side of a dielectric layer 20, as further detailed hereinabove. When quasiperiodic grating 12 is metallic, it can be optionally coated with a dielectric layer as further detailed hereinabove.

In any of the embodiments described herein, a thickness of the dielectric substrate 20 can be from about 10 μm to about 1 mm.

It was found by the present Inventors that the ability of optical device 10 to induce a double Fano-Feshbach resonance on an optical field makes it suitable for filtering the optical field, whereby the double Fano-Feshbach resonance can be selected in accordance with the desired filtering function. For example, when it is desired to filter out wavelengths outside a predetermined range, the grating(s) 12 of device 10 are selected to induce a double Fano-Feshbach resonance having a peak within this wavelength range and a width encompassing this wavelength.

FIG. 2 is a schematic illustration of an array 30 of optical sensors, according to some embodiments of the present invention. Array 30 optionally and preferably comprises an arrangement of array of active pixel cells 32. Preferably, the array 30 is a two-dimensional array. In the representative illustration of FIG. 2, active pixel cells 32 form a rectangular array, but other geometries are also contemplated. Array 30 can be configured for sensing back illumination and/or front illumination.

In some embodiments of the present invention each active pixel cell 32 comprises an optical sensing element 36, optical device 10, and optionally and preferably also a signal processing circuit 38 in electronic communication with optical sensing element 36. The grating pattern of optical device 10 optionally and preferably varies across array 30 such that at least two optical sensing elements receive light from different grating patters. This allows array 30 to function as a multicolor optical sensor.

In operation, light first interacts with device 10 and is being filtered thereby. The filtered light arrives at sensing element 36 which generates an electronic signal in response to the interaction with the light. Signal processing circuit 38 receives the electronic signal from detector 36 and executes initial processing operations such as, but not limited to, amplification, supply of reset signal and readout, as known in the art. For clarity of presentation, each active pixel cell is shown as a including a separate optical device 10. However, this need not necessarily be the case since two or more (e.g., all) the active pixel cells can be superimposed by device 10, in which case the gratings of device 10 are selected to have different spectral responses at different regions over device 10. Also contemplated, are configurations in which several optical devices 10 are tiled over the same active pixel cell to define sub-pixel areas, each area corresponding to a different optical device 10, wherein at least two of the optical devices 10 have different spectral responses. For example, the optical devices can be tiled to form a Bayer filter over the active pixel cell.

Sensing elements 36 can be of any type, including, without limitation, CCD sensing elements or CMOS sensing elements, and circuit 38 is configured according to the type of sensing elements that are employed.

Array 30 can be used in many applications. For example, in some embodiments of the present invention array 30 serves as a component in an imaging system, in some embodiments of the present invention array 30 serves as a component in an optical spectrometer, in some embodiments of the present invention array 30 serves as a component in an optical communication system, in some embodiments of the present invention array 30 serves as a component in a slow-light optical system, in some embodiments of the present invention array 30 serves as a component in wavelength multiplexing system, in some embodiments of the present invention array 30 serves as a component in a wavelength demultiplexing system, and in some embodiments of the present invention array 30 serves as a component in an optical tuning system.

The present embodiments contemplate any number of sensing elements 36 and any number of optical devices 10 in an array. In some embodiments of the present invention an array of optical devices 10 is arranged over a single optical sensing element, in a many-to-one arrangement, wherein many optical devices 10 feed the same optical sensing element with filtered light; in some embodiments of the present invention an array of optical devices 10 is arranged over an array of optical sensing element, for example, in a one-to-one arrangement, wherein each optical device 10 feeds one of the optical sensing element with filtered light, in some embodiments of the present invention a single optical device 10 is arranged over an array of optical sensing elements in a one-to-many arrangement, wherein a single optical device 10 feeds many optical sensing elements with filtered light; and in some embodiments of the present invention a combination of the above configurations is employed.

As used herein the term "about" refers to ±10%.

The word "exemplary" is used herein to mean "serving as an example, instance or illustration." Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments." Any particular embodiment of the invention may include a plurality of "optional" features unless such features conflict.

The terms "comprises", "comprising", "includes", "including", "having" and their conjugates mean "including but not limited to".

The term "consisting of" means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Various embodiments and aspects of the present invention as delineated hereinabove and as claimed in the claims section below find experimental support in the following examples.

Examples

Reference is now made to the following examples, which together with the above descriptions illustrate some embodiments of the invention in a non limiting fashion.

The Inventor successfully generated a narrow line shape by exploiting two discrete optical states coupled to the same continuum. The present Example demonstrates that gratings-based structures to support a nearly-degenerate double Fano resonance to provide a narrow spectral line shape. The present Example also demonstrates that the double-resonance spectral location and line-shape are controllable by either adjusting the periodicity and unit-cell of the gratings or by adjusting the angle of incidence of the incoming radiation.

To simultaneously produce two different SPP discrete states an asymmetric IMI structure was devised. For the simulations carried in this Example silver (Ag) surrounded on its upper side by air and on its bottom side by sapphire ($Al_2O_3$), was selected. An optical field was simulated as entering the structure from the top side and exiting the bottom side. To couple these two SPP states to a single continuum of incoming/outgoing radiation the two metal-dielectric interfaces were periodically corrugated with a period calculated using the usual SPP excitation condition:

$$\frac{2\pi n_1 \sin(\theta_1)}{\lambda} + m\frac{2\pi}{\Lambda_i} = \pm\frac{2\pi}{\lambda}\sqrt{\frac{\epsilon_m \epsilon_i}{\epsilon_m + \epsilon_i}} \quad \text{(EQ. 1)}$$

-continued $$i = 1, 2 \quad m = 0, \pm 1, \pm 2 \ldots$$

where i=1 (2) relates to the top (bottom) dielectric-metal interface, is the optical wavelength in vacuum, n1 is the dielectric material index of refraction, $\theta_1$ is the angle of incident, $\epsilon_m$ is the metal permittivity, $\epsilon_i$ is the dielectric permittivity and $\Lambda_i$ is the period of the corrugation, matching the radiation with the SPP excitation at interface i.

The following parameters were selected in the present Example: incident angle $\theta$1=15, diffraction order m=−1 (m=1) and negative (positive) sign of the right-hand-side in EQ. 1 for the upper (bottom) corrugation profile, and λ=800 [nm] as the degenerate wavelength. This last parameter is the wavelength at which at the given incidence angle both SPP modes would be excited [23]. This also indicates the resonance frequencies of the bound states of the two plasmons excluding inherent frequency shifts associated with Fano-type line shapes. At this wavelength the materials permittivities are given by: $\epsilon_m$=−24-1.85i, $\epsilon_2$=3.0276 and $\epsilon_1$=1 [22].

For these values the corrugations periodicities on each interface are found to be $\Lambda_1$=626 [nm] and $\Lambda_2$=506 [nm]. In computer simulations, slightly different values of 630 [nm] and 500 [nm] were elected to accommodate an integer number of periods of both gratings into an overall structure length of 63[m].

The corrugations located on each side of the metal were chosen to be sufficiently deep for proper coupling between the incident light and the SPP modes. Optimization based on numerical simulations (all simulations were carried using the commercial COMSOL Multiphysics software package) yielded the corrugation thickness on the air side to be h1=50 [nm] and on the sapphire side h2=40 [nm]. For structural integrity, an additional unbroken metal layer separates between both corrugations. The thickness of this layer was chosen to be 10 [nm] in order to minimize the total power losses inside the metal but still be thick enough to allow for possible fabrication.

Spectral characterization of the field transmission is carried with the parameter $$|S_{21}| = \sqrt{\frac{\text{Transmitted Power}}{\text{Incident Power}}}$$

for a TM incident polarization field. At first two simpler structures were considered: one structure having a single corrugation on its upper side while the second structure having the corrugation on its lower side (see FIGS. 4A-B and 4C-D). As shown, in both cases, the interference between the direct scattering to the continuum indirect channel through the single bound discrete SPP state results in a standard asymmetric FFR line-shape. Both FFR line shapes in FIGS. 4B and 4D can be matched to the form:

$$T(\kappa) \propto \frac{(\kappa + q_r)^2 + q_i^2}{1 + \kappa^2} \quad \text{(EQ. 2)}$$

where $T=|S_{21}|^2$, $\kappa=(\omega-\omega_R)/\Gamma$ is the reduced energy, $q_r$ describes the degree of the asymmetry of the line shape, $q_i$ describes the intrinsic losses, $\Gamma$ is the spectral line-width, and $\omega_R$ is the resonance frequency. Note that unlike the original work by Fano (see Ref. [5]), where a real asymmetry parameter q, the present embodiments employ a complex number $q=q_r+iq_i$ to account for losses through its imaginary part.

The parameters of the grating are optionally and preferably mapped to the parameters of the line-shape. Broadly speaking, the asymmetry parameter describes the relative coupling strength of the incoming radiation to the SPP state and to the scattered radiation state, and these couplings are determined by the shape of the grating's unit-cell. Thus, the period of the grating is selected to provide a predetermined approximate resonance $\omega_R$ of the line-shape, and the unit-cell configuration of the grating is optionally and preferably selected based on the asymmetry parameter qr.

The matching of the line shapes parameters that fit Eq. (2) for the lossless case, were extracted from each of the two single FFR cases, shown in FIGS. 4B and 4D, by first solving three equations involving the three unknown parameters $\omega_R$, $\Gamma$, and $q_r$. The first equation, relates the maximum location of Eq. (2) to $\omega_R$, the second one relates the minimum location of Eq. (2) to $q_r$ and third one the relates the location of one half of the maximal value of Eq. (2) to $\Gamma$.

The parameters resulting from solving the three equations were then used as an initial guess for a subsequent least-square curve-fitting optimization process to match the simulated line-shapes to the form given with Eq. (2). This optimization results in the parameters given in Table 1, below, for an IMI structure having the corrugation only on its top side, and for an IMI structure having the corrugation only on its bottom side. In addition, for normalizing the amplitude of the analytic line shapes to the numerical results, the maximal value of each single FFR line-shape was normalized to the maximal value of the corresponding peak in the numerically simulated single FFR line-shape. The parameters in Table 1 are given by least-squares optimization fitting the data of the numerical simulations to Eq. (2). i=1(2) is for the structure with top (bottom) corrugation.

TABLE 1

FFR profile parameters for the lossless model of two different structures having a single grating.

| i | $\Gamma$ [PHz] | $\omega_R$ [PHz] | $q_r$ |
|---|---|---|---|
| 1 | 0.01 | 2.29 | −4.25 |
| 2 | 0.03 | 2.47 | 10.34 |

For a double FFR, there are two discrete bound modes which are coupled to the same continuum. When radiation is transmitted through a device supporting such a configuration, it can be described as the contribution of three terms interfering together. These three terms include a direct scattering path and two indirect paths through the bound states. The line-shape in this case is derived through an implicit analysis:

$$T(\epsilon) \propto \frac{\left(1 + \frac{q_{1r}\Gamma_1}{\epsilon - \epsilon_{R1}} + \frac{q_{2r}\Gamma_2}{\epsilon - \epsilon_{R2}}\right)^2 + \left(\frac{q_{1i}\Gamma_1}{\epsilon - \epsilon_{R1}} + \frac{q_{2i}\Gamma_2}{\epsilon - \epsilon_{R2}}\right)^2}{1 + \left(\frac{\Gamma_1}{\epsilon - \epsilon_{R1}} + \frac{\Gamma_2}{\epsilon - \epsilon_{R2}}\right)^2} \quad \text{(EQ. 3)}$$

Note that for $q_1=q_2=0$, this line shape is identical to the line-shape associated with EIT.

According to some embodiments of the present invention two separated corrugations are combined, wherein each corrugation is on one of the sides of the metal layer (FIG. 4E). Thus, each corrugation couples the radiation mode to a different SPP mode. The transmission indeed results in a double FFR line-shape (see the continuous line in FIG. 4F).

The simulated line-shape (without losses) was fitted to Eq. (3) using least squares optimization, where the initial guess for the parameters were taken as the single FFR line shape parameters given in Table 1. This provided in the parameters given in Table 2, below. The parameters in Table 2 are given by least-squares optimization fitting the data of the numerical simulations to Eq. (3). i=1(2) stands for resonance associated with the top (bottom) corrugation.

TABLE 2

Double FFR profile parameters for the lossless model for the double-grating structure.

| i | $\Gamma$ [PHz] | $\omega_R$ [PHz] | $q_r$ |
|---|---|---|---|
| 1 | 0.01 | 2.29 | −11.6 |
| 2 | 0.025 | 2.46 | 12.3 |

Tables 1 and 2 demonstrate that the overall width (associated with $\Gamma$) of the two resonances as well as their central frequency ($\omega_R$) do not change significantly when two separate resonances are engineered together into the same device. However, the asymmetry parameters $q_r$ changed significantly. Without being bound to any particular theory, it is assumed that this change is because the top SPP is better coupled to the transmitted radiation as there is less metal between them, which enlarge the asymmetry parameter, and also due to the coupling between the two resonances. The coupling between the two modes are expected to be reduced when losses are added to the model.

FIG. 4F shows the difference between the double FFR line-shape which is constructed by applying the line-shape parameters of the two separate single FFR devices (dotted line) to the double FFR line shape (dashed line) that best fits the actual line-shape of the device (continuous line).

When the intrinsic losses of the metal are included in the modelling, it changes the parameters of the line-shapes. Generally, the transmission of the field is weaker and the width of the resonances increases. The absolute value of the asymmetry parameter also decreases. In addition, the minima in the line-shape increase. These characteristics are shown in the line shapes of the single FFR devices depicted in FIGS. 5B and 5D (continuous line) when compared to the lossless case seen in FIGS. 4B and 4D. The same procedure as for the lossless-case was used to extract the single FFR line-shape parameters that best fit the simulated line-shapes for the single grating devices. The difference is that another equation was added in the initial step, which relates the imaginary part of the asymmetry parameter to the displacement of the minimum of the line shape from zero.

The extracted parameters are given in Table 3, below. The single FFR line-shape with these parameters are shown in FIG. 5(a-b) (dashed line). The parameters in Table 3 are given by least-squares optimization fitting the data of the numerical simulations to Eq. (2). i=1(2) is for the structure with top (bottom) corrugation.

TABLE 3

FFR profile parameters for the lossy model of two different structures having a single grating

| i | $\Gamma$ [PHz] | $\omega\_R$ [PHz] | $q_r$ | $q_i$ |
|---|---|---|---|---|
| 1 | 0.012 | 2.29 | −1.92 | 1.8 |
| 2 | 0.04 | 2.46 | 3.35 | 0 |

When the two gratings are combined into the same device, apart from the asymmetry parameters, the parameters extracted to best fit the double FFR line-shape (given in Table 4, below) are relatively similar to the parameters extracted for the two different single grating structures (given in Table 3), as with the lossless models. The best fit line-shape (FIGS. 5B and 5D dashed line) and the line-shape with the parameters of the two single-grating devices (FIGS. 5B and 5D dotted line) are similar. This similarity is attributed, without being bound to a particular theory, to reduced interaction between the top and bottom SPP modes compared with the lossless case. The parameters in Table 4 are given by least-squares optimization fitting the data of the numerical simulations to Eq.(3). i=1(2) stands for resonance associated with the top (bottom) corrugation.

TABLE 4

Double FFR profile parameters for the lossy model for the double-grating structure.

| i | $\Gamma$ [PHz] | $\omega\_R$ [PHz] | $q_r$ | $q_i$ |
|---|---|---|---|---|
| 1 | 0.013 | 2.29 | −1.33 | 9 |
| 2 | 0.052 | 2.44 | 7.78 | 4.69 |

The double FFR line-shape can be modified by changing the periodicity of one of the gratings. For example, one of the resonances can be "scanned" over the other resonance. This is demonstrated in a series of simulations (depicted in FIGS. 6A-F, where the period of the top corrugation is set in steps which move the top SPP resonance from lower to higher wavelengths compared with the resonance of the bottom SPP.

Figure 6A:
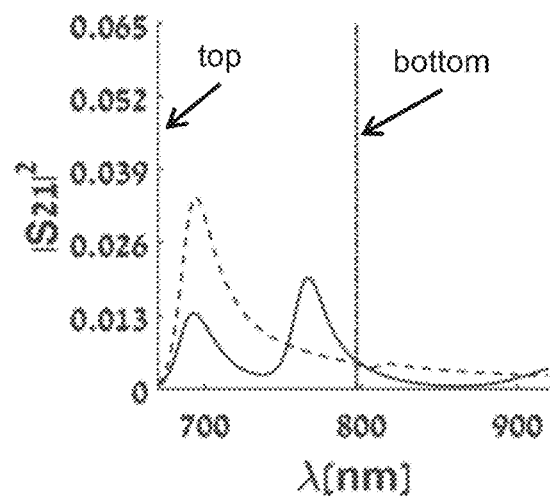
FIGS. 6A-F show relative shift of resonances. Numerical simulations (continuous line) of double FFR line-shape (including losses) when the location of top Surface Plasmon Polariton (SPP) resonance is scanned over the position of the bottom SPP resonance by changing the top corrugation periodicity to be 510 nm (FIG. 6A), 530 nm (FIG. 6B), 560 nm (FIG. 6C), 580 nm (FIG. 6D), 600 nm (FIG. 6E) and 620 nm (FIG. 6F). The dashed line represents the simulated single FFR line shape for a structure containing only the top corrugation. The vertical dashed lines mark the wavelength at which Eq. (1), below, is satisfied for the different grating periods for the structure containing only the top or bottom corrugation.
Figure 6B:
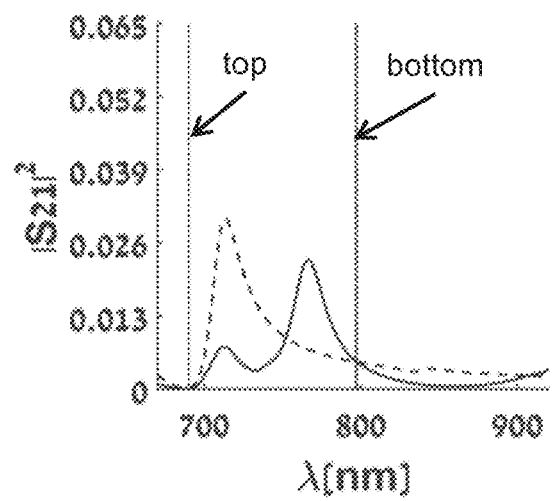
Figure 6C:
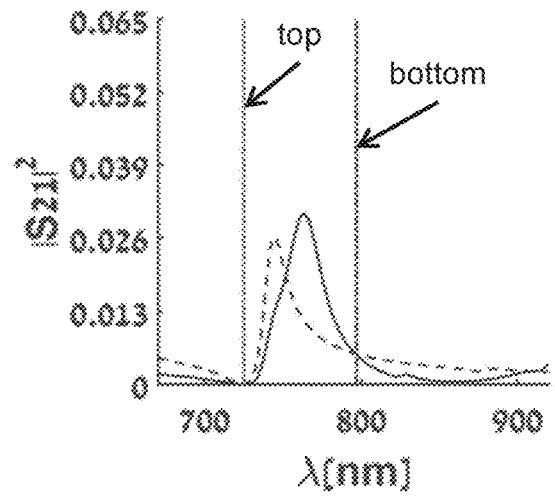
Figure 6D:
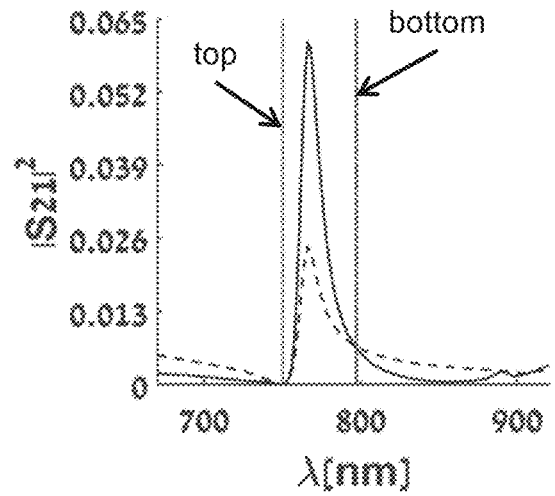
Figure 6E:
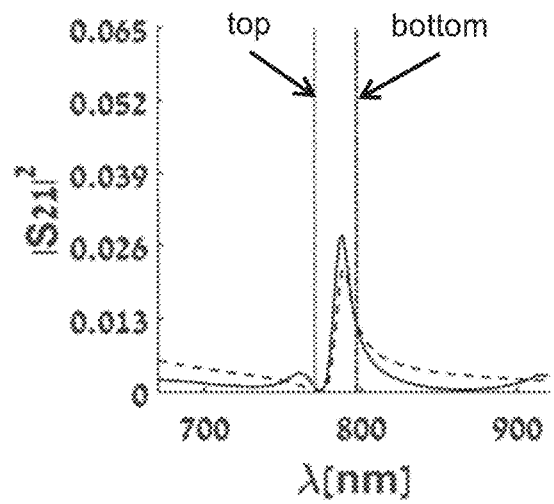
Figure 6F:
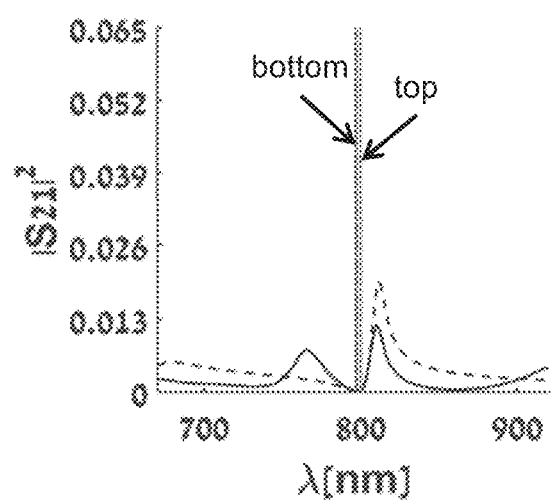

The vertical dashed lines in FIGS. 6A-F denote the wavelengths at which EQ. 1 is satisfied for the different cases for both the top corrugation and associated SPP and the bottom corrugation and associated SPP. These wavelengths are not the exact resonant wavelengths as the actual resonant frequencies are shifted from these values due to the interplay with other channels in the system (such as direct scattering or interaction between the bound states). The degenerate case for which $\omega_{R1}=\omega_{R2}$ is depicted in FIG. 6D, where the double FFR profile is reduced to a single FFR line-shape having a single zero. The nearly-degenerate cases are shown in FIGS. 6E and 6F. These cases exhibit features which are narrower than the corresponding single Fano resonance given by a single-grating device. Changing the unit-cell configuration also changes the form of the line-shape as these modify the asymmetry parameters. For achieving a specific goal, such as minimizing the width of the prominent feature of the line-shape, numerical optimizations are optionally and preferably employed.

The dependence of the double FFR line-shape on the incident angle of the impinging radiation was simulated. The results are shown in FIGS. 7A-E. Modifying the incident angle changes the wavelengths which are coupled to SPP modes. As the two SPP dispersion curves are different, this change in the coupled wavelength is different for each SPP.

As a result, scanning the incident angle has a similar effect to a change in the periodicity of one of the gratings, so one resonance can be scanned over its counterpart in the double FFR line-shape. As such, the spectral response of the structure of the present embodiments is tunable. For example, spectral response can be manipulated by modifying the angle of incidence of the incoming light.

This Example describes an asymmetric IMI structure that supports a double FFR line-shape. The overall line-shape is optionally and preferably determined by the periodicities of the gratings at the metal-insulator interfaces of the structure, and also by their unit-cell configuration. The location of the resonances is related to the periodicities as was shown by computer simulations. The asymmetry parameters are determined mainly by the shape of the unit-cell of each grating. The fact that the double FFR line-shape generally exhibits sharper features compared to the single FFR line-shape, together with the possibilities of tuning its features, and the simplicity of the structure, makes the structure of the present embodiments useful for many applications, including, without limitation, sensing, field enhancement and slow-light devices.

Figure 8A:
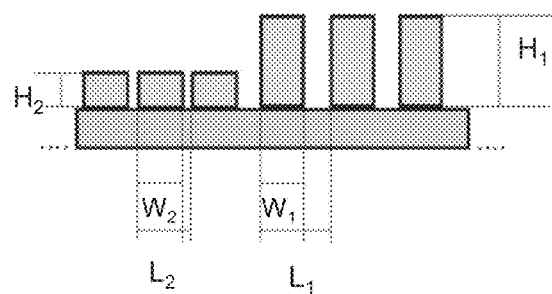
FIGS. 8A-C show double FFR resonance using two adjacent gratings made of gold on top of Sapphire supporting coupling to two spatially-separated nearly wavelength-degenerate SPP modes.
Figure 8B:
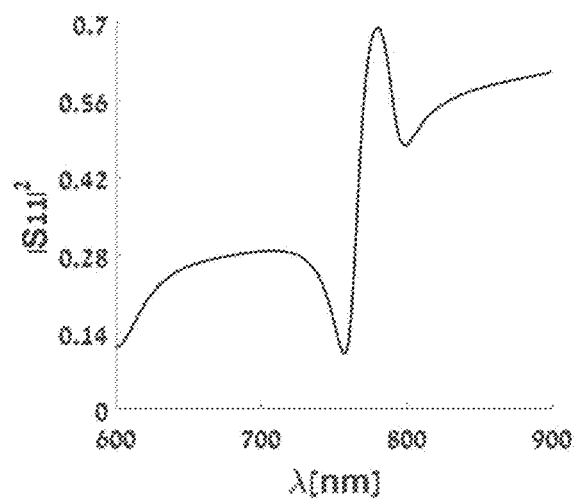
Figure 8C:
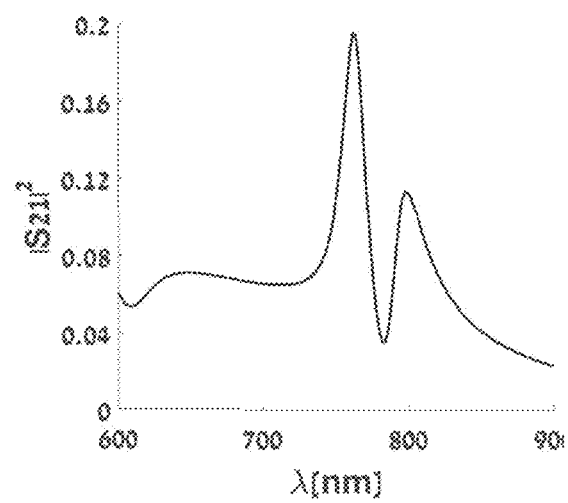

The structure depicted in FIG. 8A and the spectra shown in FIGS. 8B and 8C demonstrate that an optical field can be coupled to two different SPP modes also when the metallic gratings are on the same side of the substrate. In this case, the gratings are arranged side-by-side. A few wavelengths away from the structure, the interference of the radiation transmitted or reflected from the two gratings is already established leading to the double FFR line shape. The two gratings have different periodicities to couple to SPP modes at different frequencies. The grating periodicities control the resonances of the SPPs while the different unit cells of the two gratings control other aspects of the line shape. The different height of the gratings provide for a line shape having opposite sign asymmetry parameters which contribute to a sharper line-shape.

Figure 9A:
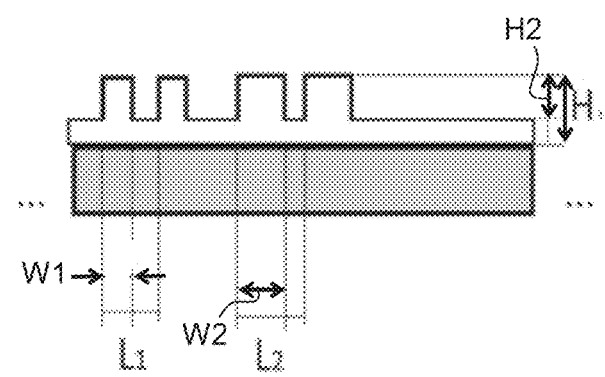
FIGS. 9A-C show double FFR resonance using two adjacent all-dielectric gratings made of Sapphire, supporting coupling of incoming radiation to two guided modes in the grooves of each grating.
Figure 9B:
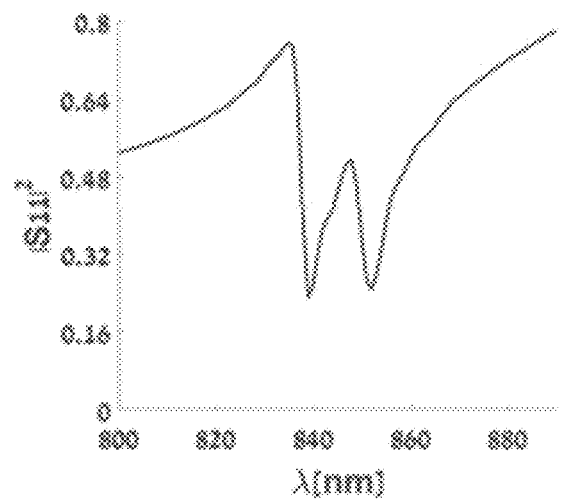
Figure 9C:
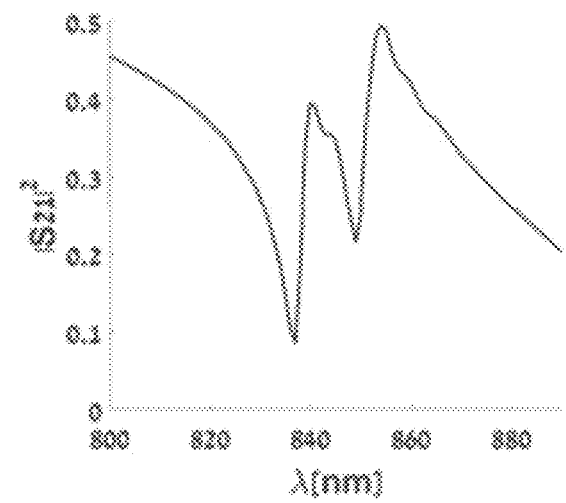

The structure depicted in FIG. 9A and the spectra shown in FIGS. 9B and 9C demonstrate that an optical field can be coupled to two different SPP modes also in the case where the gratings on the same side of the substrate are dielectric. The line shape is stronger than for the case of the plasmonic system (FIGS. 8A-C). The reason is that SPP modes are susceptible to absorption, which is suppressed for the guided modes in the dielectric structure.

Figure 10A:
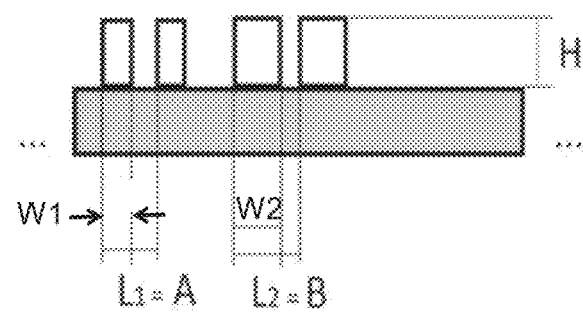
FIGS. 10A-C show double FFR resonance using a quasiperiodic grating made of Gold on Sapphire, supporting coupling of incoming radiation to two SPP modes at the gold-air and gold-metal interfaces.
Figure 10B:
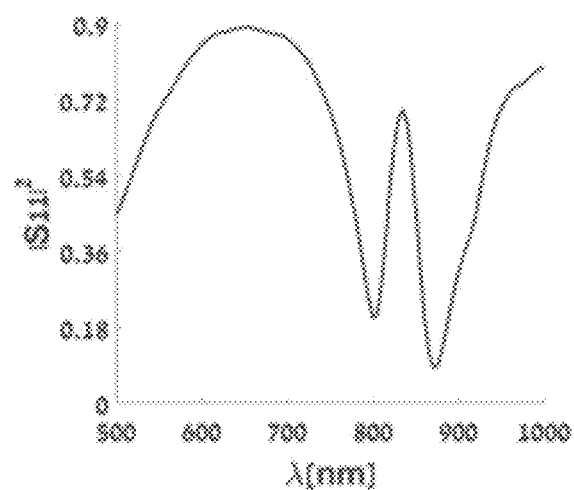
Figure 10C:
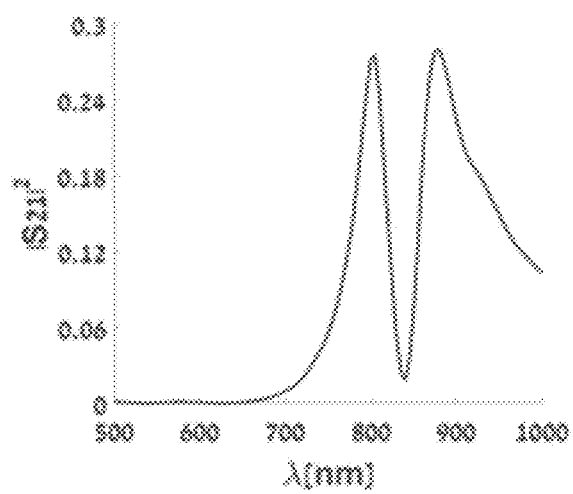

The structure depicted in FIG. 10A (made of a metallic grating on top of dielectric substrate) and the spectra shown in FIGS. 10B and 10C demonstrate that an optical field can be coupled to two different SPP modes also when a single quasiperiodic gratings is employed. FIG. 10A shows the basic ingredient of the geometry without detailing the actual ordering of the two unit cells denoted by A and B. The spectra of this structure can be designed using the teachings found in, for example, references [37, 38]. For example, in some embodiments of the present invention a technique known as cut and project is employed. A quasiperiodic all-dielectric structure can also be used according to some embodiments of the present invention. In these embodiments, two different spatial modes at two close frequencies can be used as the two modes to use for realizing the double FFR line shape.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

REFERENCES

[1] Andrey E. Miroshnichenko, Sergej Flach, and Yuri S. Kivshar. Fano resonances in nanoscale structures. Rev. Mod. Phys., 82:2257{2298, August 2010.

[2] Boris Luk'yanchuk, Nikolay I. Zheludev, Stefan A. Maier, Naomi J. Halas, Peter Nordlander, Harald Giessen, and Chong Tow Chong. The Fano resonance in plasmonic nanostructures and metamaterials. Nature Materials, 9:707{715, 2010.

[3] B. Gallinet, A. Lovera, T. Siegfried, H. Sigg, and O. J. F. Martin. Fano resonant plasmonic systems: Functioning principles and applications. AIP Conference Proceedings, 1475(1), 2012.

[4] Ph Durand, I Paidarova, and F X Gadea. Theory of Fano profiles. Journal of Physics B: Atomic, Molecular and Optical Physics, 34(10):1953, 2001.

[5] U. Fano. Effects of configuration interaction on intensities and phase shifts. Phys. Rev., 124:1866{1878, December 1961.

[6] Herman Feshbach. Uni ed theory of nuclear reactions. Annals of Physics, 5(4):357 {390, 1958.

[7] Kiyoshi Ueda. Spectral line shapes of autoionizing rydberg series. Phys. Rev. A, 35:2484{2492, March 1987.

[8] A Giusti-Suzor and U Fano. Alternative parameters of channel interactions. i. symmetry analysis of the two-channel coupling. Journal of Physics B: Atomic and Molecular Physics, 17(2):215, 1984.

[9] Frederick H. Mies. Configuration Interaction Theory. Effects of Overlapping Resonances. Phys. Rev., 175:164{175, November 1968.

[10] W. Leonski, R. Tanas, and S. Kielich. Laser-induced autoionization from a double fano system. J. Opt. Soc. Am. B, 4(1):72{77, January 1987.

[11] S. E. Harris. Lasers without inversion: Interference of lifetime-broadened resonances. Phys. Rev. Lett., 62:1033{1036, February 1989.

[12] Nikitas Papasimakis and Nikolay I. Zheludev. Meta-material-induced transparency: sharp fano resonances and slow light. Opt. Photon. News, 20(10):22{27, October 2009.

[13] Carlo Forestiere, Luca Dal Negro, and Giovanni Miano. Theory of coupled plasmon modes and fano-like resonances in subwavelength metal structures. Phys. Rev. B, 88:155411, October 2013.

[14] Junqiao Wang, Chunzhen Fan, Jinna He, Pei Ding, Erjun Liang, and Qianzhong Xue. Double fano resonances due to interplay of electric and magnetic plasmon modes in planar plasmonic structure with high sensing sensitivity. Opt. Express, 21(2):2236{2244, January 2013.

[15] Jiwei Qi, Zongqiang Chen, Jing Chen, Yudong Li, Wu Qiang, Jingjun Xu, and Qian Sun. Independently tunable double fano resonances in asymmetric mim waveguide structure. Opt. Express, 22(12):14688{14695, June 2014.
[16] Alp Artar, Ahmet Ali Yanik, and Hatice Altug. Directional double fano resonances in plasmonic hetero-oligomers. Nano Letters, 11(9):3694{3700, 2011. PMID: 21806006.
[17] Guo-Zhou Li, Qiang Li, and Li-Jun Wu. Double fano resonances in plasmonic nanocross molecules and magnetic plasmon propagation. Nanoscale, 7:19914{19920, 2015.
[18] Robert E. Simpson Lei Zhang Tun Cao, Chenwei Wei and Martin J. Cryan. Fast tuning of double fano resonance using a phase-change metamaterial under low power intensity. Sci Rep., (4):4463, 2014.
[19] Tsubasa Nishida, Yosuke Nakata, Fumiaki Miyamaru, Toshihiro Nakanishi, and Mitsuo W. Takeda. Observation of fano resonance using a coupled resonator metamaterial composed of meta-atoms arranged by double periodicity. Applied Physics Express, 9(1):012201, 2016.
[20] Yuping Zhang, Tongtong Li, Beibei Zeng, Huiyun Zhang, Huanhuan Lv, Xiaoyan Huang, Weili Zhang, and Abul K. Azad. A graphene based tunable terahertz sensor with double fano resonances. Nanoscale, 7:12682{12688, 2015.
[21] Chen X D Chen W J Dong J W Ouyang Z Wang GP1 Deng Z L, Yogesh N. Full controlling of fano resonances in metal-slit superlattice. Sci Rep., (5):18461, 2015.
[22] M. N. Polyanskiy. Refractive index database. 2016.
[23] H. Raether. Surface plasmons on smooth and rough surfaces and on gratings. Number v. 111 in Springer tracts in modern physics. Springer, 1988.
[24] Quang Minh Ngo, Khai Q. Le, Dinh Lam Vu, and Van Hoi Pham. Optical bistability based on fano resonances in single- and double-layer nonlinear slab waveguide gratings. J. Opt. Soc. Am. B, 31(5):1054{1061, May 2014.
[25] Stephane Collin, Gregory Vincent, Riad Haidar, Nathalie Bardou, Sylvain Rommeluere, and Jean-Luc Pelouard. Nearly perfect fano transmission resonances through nanoslits drilled in a metallic membrane. Phys. Rev. Lett., 104:027401, January 2010.
[26] Ye Zhou, M. C. Y. Huang, C. Chase, V. Karagodsky, M. Moewe, B. Pesala, F. G. Sedgwick, and C. J. Chang-Hasnain. High-index-contrast grating (hcg) and its applications in optoelectronic devices. Selected Topics in Quantum Electronics, IEEE Journal of, 15(5):1485{1499, September 2009.
[27] Bjorn C. P. Sturmberg, Kokou B. Dossou, Lindsay C. Botten, Ross C. McPhedran, and C. Martijn de Sterke. Fano resonances of dielectric gratings: symmetries and broadband filtering. Opt. Express, 23 (24): A1672{A1686, November 2015.
[28] Jiao Lin, Lujun Huang, Yiling Yu, Sailing He, and Linyou Cao. Deterministic phase engineering for optical fano resonances with arbitrary lineshape and frequencies. Opt. Express, 23(15):19154{19165, July 2015.
[29] Zhao-xian Chen, Jin-hui Chen, Zi-jian Wu, Wei Hu, Xue-jin Zhang, and Yan-qing Lu. Tunable fano resonance in hybrid graphene-metal gratings. Applied Physics Letters, 104(16), 2014.
[30] Yong S Joe, Arkady M Satanin, and Chang Sub Kim. Classical analogy of fano resonances. Physica Scripta, 74(2):259, 2006.
[31] Benjamin Gallinet. Fano Resonances in Plasmonic Nanostructures. PhD thesis, STI, Lausanne, 2012.
[32] Andreas Barnthaler et al, Probing decoherence through fano resonances. Phys. Rev. Lett., 105:056801, July 2010.
[33] I. Avrutsky, R. Gibson, J. Sears, G. Khitrova, H. M. Gibbs, and J. Hendrickson. Linear systems approach to describing and classifying fano resonances. Phys. Rev. B, 87:125118, March 2013.
[34] C Genet, M. P van Exter, and J. P Woerdman. Fano-type interpretation of red shifts and red tails in hole array transmission spectra. Optics Communications, 225(4{6): 331{336, 2003.
[35] Michael Fleischhauer, Atac Imamoglu, and Jonathan P. Marangos. Electromagnetically induced transparency: Optics in coherent media. Rev. Mod. Phys., 77:633{673, July 2005.
[36] Benjamin Gallinet and Olivier J. F. Martin. Ab initio theory of fano resonances in plasmonic nanostructures and meta-materials. Phys. Rev. B, 83:235427, June 2011.
[37] Zia, R. K. P., and W. J. Dallas. A simple derivation of quasi-crystalline spectra" Journal of Physics A: Mathematical and General 18: L341, 1985.
[38] Lifshitz, Ron, Ady Arie, and Alon Bahabad. Photonic quasicrystals for nonlinear optical frequency conversion. Physical review letters 95:133901, 2005.

What is claimed is:

1. An optical device, comprising a first grating and a second grating formed on or attached to a dielectric layer and configured to simultaneously couple an optical field interacting therewith into two distinct Fano-Feshbach resonances, wherein said first and said second gratings differ in at least one grating characteristic selected from the group consisting of a grating period, a grating depth, and a grating duty cycle.

2. The device according to claim 1, wherein said first grating and said second grating are dielectric gratings formed on the same side of said dielectric substrate.

3. The device of claim 1, wherein said first grating and said second grating are formed on the same side of a metallic layer attached to said dielectric substrate.

4. The optical device according to claim 3, wherein said metallic layer comprises a material selected from the group consisting of gold, silver, platinum, aluminum, copper, rhodium, iridium, tungsten and molybdenum.

5. The device of claim 1, wherein said first grating and said second grating are formed on opposite sides of a metallic layer and wherein said dielectric layer is disposed on said first grating.

6. The device according to claim 5, wherein a vertical separation between said first grating and said second gratings, perpendicularly to said metallic layer is from about 5 nm to about 20 nm, e.g., about 10 nm.

7. The device according to claim 5, further comprising an additional dielectric layer disposed on said second grating, wherein said first and said second dielectric layers are made of different materials.

8. The device according to claim 1, wherein each of said first grating and said second gratings has a grove depth of from about 10 nm to about 100 nm, more preferably from about 30 nm to about 60 nm.

9. The optical device according to claim 1, wherein at least said first grating is a chirped quasiperiodic grating.

10. The optical device according to claim 1, wherein said dielectric layer comprises a dielectric material selected from the group consisting of sapphire, quartz, silicon, silicon carbide, gallium nitride, gallium phosphide, zirconium diboride, gallium arsenide, silica and glass.

11. The optical device according to claim 1, wherein a thickness of said dielectric layer is from about 10 µm to about 1 mm.

12. The optical device according to claim 1, being designed for a predetermined wavelength and wherein a thickness of said dielectric layer is at least two times said wavelength.

13. A method of filtering an optical field, comprising directing the optical field to the optical device according to claim 1.

14. An optical sensor, comprising an optical sensing element and the optical device according to claim 1 disposed thereon.

15. An optical sensor array, comprising an array of optical sensors, each comprising the optical sensor of claim 14, wherein said optical sensors are arranged such that at least two sensing elements receive light from different grating patterns.

16. A system comprising the optical sensor array of claim 15, the system being selected from the group consisting of an imaging system, an optical spectrometer, an optical communication system, a slow-light optical system, a wavelength multiplexing system, a wavelength demultiplexing system, and an optical tuning system.

17. The optical sensor of claim 14, wherein said optical sensor is a CCD sensor.

18. The optical sensor of claim 14, wherein said optical sensor is a CMOS sensor.

19. An optical sensor array, comprising an array of optical sensing elements, and the optical device according to claim 1 disposed on said array, wherein a grating pattern of said optical device varies across said array such that at least two sensing elements receive light from different grating patterns.

20. An optical device, comprising a quasiperiodic grating formed on or attached to a dielectric layer and configured to simultaneously couple an optical field interacting therewith into two distinct Fano-Feshbach resonances.

21. The optical device according to claim 20, wherein said grating is a dielectric grating formed on said dielectric layer.

22. The optical device according to claim 20, wherein said grating is a metallic grating formed on a metallic layer, and wherein said dielectric layer is disposed on said grating.

23. The optical device according to claim 22, wherein said metallic layer comprises a material selected from the group consisting of gold, silver, platinum, aluminum, copper, rhodium, iridium, tungsten and molybdenum.

24. The optical device according to claim 20, wherein said grating is a chirped quasiperiodic grating.

* * * * *